ns et al. ............. 260/18 N
United States Patent [19]
Hinze et al.

[11] 4,247,426
[45] Jan. 27, 1981

[54] POLYAMIDES

[75] Inventors: Adriën G. Hinze, Dordrecht; Hendrik G. Stigter, Berkenwoude, both of Netherlands

[73] Assignee: Emery Industries, Inc., Cincinnati, Ohio

[21] Appl. No.: 974,469

[22] Filed: Dec. 29, 1978

[30] Foreign Application Priority Data

Dec. 29, 1977 [GB] United Kingdom ............ 54116/77

[51] Int. Cl.$^3$ .............................................. C08G 59/44
[52] U.S. Cl. .......................... 260/18 PN; 260/18 N; 260/404.5; 528/113; 528/114
[58] Field of Search ............ 260/18 PN, 18 N, 830 P, 260/857 TW, 404.5; 528/113, 114

[56] References Cited
U.S. PATENT DOCUMENTS

| | | | |
|---|---|---|---|
| 2,811,495 | 10/1957 | Wittcoff et al. ............... | 260/18 PN |
| 3,652,469 | 3/1972 | Glaser et al. ................... | 260/18 N |
| 3,998,771 | 12/1976 | Feneis et al. .................. | 260/18 PN |
| 4,049,598 | 9/1977 | Peerman et al. ............... | 260/18 N |
| 4,062,819 | 12/1977 | Mains et al. ................... | 260/18 N |
| 4,062,820 | 12/1977 | Mitchell et al. ................ | 260/18 N |
| 4,072,641 | 2/1978 | Loeb ............................... | 260/18 N |
| 4,122,229 | 10/1978 | Mitchell et al. ................ | 260/18 N |

*Primary Examiner*—Ronald W. Griffin
*Attorney, Agent, or Firm*—Kenneth D. Tremain

[57] ABSTRACT

The invention relates to novel polyamides substantially based on polycarboxylic acids, in particular polymerized fatty acids, and polyalkylene polyamines in which the recurring alkylene groups are of different carbon chain lengths and two or more different alkylene imine groups occur. These polyamides show amine values from 5–600, acid values below 2 and viscosities of 0.05–25 Pa s and are useful as curing catalysts for epoxy resins.

9 Claims, No Drawings

POLYAMIDES

This invention relates to polyamides, their preparation and use. More in particular the invention relates to polyamides substantially based on polycarboxylic acid and polyamine. Polyamines include hereinbelow diamines, triamines etc. and polycarboxylic acids include i.a. dimeric, trimeric and higher oligomeric fatty acids. Polyamides of this general type are known and have been used for various purposes. Reactive polyamides i.e. polyamides containing appreciable amounts of free amine or free carboxyl groups as evidenced by their amine value and acid value have, inter alia, been used as curing agents for resins. Polyamides with amine values of 5–250 and even higher have in particular been used as curing agent for epoxide resins as they impart certain desirable properties, such as improved impact resistance and flexural strength, to the resin.

One of the problems encountered in compounding polyamide-epoxide resins is that the reactive polyamide resins employed are usually semi-liquid, highly viscous polymers and therefore difficult to handle. Attempts have therefore been made to lower the pour point and to reduce the viscosity of these polyamides. Thus it has been proposed to improve the rheological properties of polyamides based on polymeric fatty acids and excess polyamine such as ethylenediamine (EDA), diethylenetriamine (DETA), triethylenetetramine (TETA), and similar higher polyamines with recurring ethylene imine fragments by heating these polyamides during or after their preparation to reaction temperatures exceeding 250° C. for prolonged periods, so as to effect the formation of imidazoline rings. Formation of imidazoline rings reduces the viscosity, but at the same time also the reactivity towards the epoxy resin is reduced. It has been found difficult in practice to reach a satisfactory compromise between viscosity and reactivity with these imidazoline-containing products.

It has now been found that certain novel polyamides possess relatively low viscosities combined with a high reactivity. These polyamides are substantially based on polycarboxylic acids, in particular on polymeric fatty acids and polyalkylene polyamines in which the n recurring alkylene groups are of different carbon chain lengths. These polyamines possess alkylene groups containing 1–5, preferably 2 or 3 carbon atoms and 2–6, preferably 2 or 3 recurring alkylene groups in the molecule. In these polyamines two or more different alkylene imine groups occur in a regular or irregular, preferably alternating sequence. The polyalkylene polyamines on which the polyamides according to the invention are based have the general formula

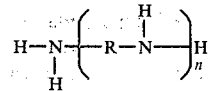

in which n=2–6, and in which the n recurring groups R comprise at least two different $C_1$–$C_5$, preferably $C_2$–$C_3$ alkylene groups. The groups R may be present in any regular or irregular pattern but an alternating sequence is preferable. Very suitable polyamines are e.g. 3-(2-amino ethyl) amino propylamine (3-azahexane-1,6-diamine), N,N'-bis (3-amino propyl) ethylenediamine (4,7-diazadecane-1,10-diamine) N,N'-bis (2-amino ethyl) 1,3-propylenediamine (3,7-diazanonane-1,9-diamine), and 4,7,11-triaza-tetradecane-1,14-diamine, but other similar polyamines may equally be used. Mixtures of polyalkylene polyamines of this type can be used and they may also be combined with up to 50, preferably less than 25 mol. percent of polyamines of a different type, such as e.g. those with identical recurring alkylene imine groups or other aliphatic, cycloaliphatic and aromatic polyamines, such as trimethylhexamethylene diamine, isophorone diamine and piperazine. The polycarboxylic acid constituent on which the polyamides according to the present invention are substantially based are preferably polymerized fatty acids, i.e. polymerized $C_{12}$–$C_{22}$ monocarboxylic acids, more in particular polymerized $C_{18}$-fatty acids such as stearic acid, oleic acid, linoleic acid and linolenic acid. Customarily unsaturated fatty acids are polymerized, which polymerized acids are separated into a monomeric and a polymeric fraction and the polymeric fraction may be subjected to further treatments like hydrogenation, bleaching and separation into fractions. Technical grades of these polymerized fatty acids substantially consist of monocarboxylic acid (Monomer), dicarboxylic acid (Dimer) and tricarboxylic acid (Trimer) in varying amounts. E.g., products with the following compositions can be used with advantage: T:D:M 20:80:1 (Empol®1022), 80:20:0 (Empol 1040) and 5:95:0 (Empol 1010). Instead of polyamines and polycarboxylic acids also their functional derivatives may be used to prepare polyamides. Other dicarboxylic acids can also be included, even up to 80 mol.%, in particular $C_4$–$C_{24}$ dicarboxylic acids e.g. adipic acid, azelaic acid, sebacic acid, terephthalic acid, etc. ®Empol is a registered trademark of Emery Ind. Inc. USA and Unilever-Emery N.V. at Gouda, Netherlands. To obtain special effects other compounds may be built into the polyamide by incorporating them into the reaction mixture. Such ingredients are e.g. polymeric fatty acid amines, lactams, and chain stoppers such as monoamines and $C_2$–$C_{20}$ monocarboxylic acids. Especially monocarboxylic acids $C_8$–$C_{18}$ straight or branched chain are useful chain stoppers.

Dependent on the reactivity desired in the eventual polyamide, usually an excess amount of amine, expressed in equivalents, is used, but excess carboxylic acids may also be applied.

The polyamides according to the invention can be prepared by methods known in the art, by heating the reaction components to temperatures of 150°–325° C., in particular 200°–270° C., for several hours, preferably under conditions which allow water of reaction to escape. Addition of an entrailment agent to the reaction mixture and/or blanketing under an inert gas is often advantageous. Polyamides according to the invention prepared at the lower range of reaction temperatures indicated above show low viscosities and pour points as compared with the corresponding polyamides based on e.g. diethylenetriamine etc. For instance certain polyamides based on 3-(2-amino ethyl aminopropyl) amine and N,N'-bis-(3-amino propyl) ethylenediamine and homologues thereof prepared at reaction temperatures of 200°–250° C. show pour points and viscosities which can be attained only with TETA-based polyamides containing appreciable amounts of imidazoline (5-membered) rings. The viscosity of the polyamides according to the present invention can be even further reduced by heating to temperatures above 250° C., possibly leading to some formation of 6-membered ring structures, which however hardly affects the reactivity. The polyamides according to the invention are light- to amber-coloured liquids having viscosities of 0.05-25, preferably 0.1-3.0 Pa s at 75° C. and amine values from 5-600, preferably 100-500, combined with acid values below 2, preferably below 1. However also polyamides with acid values of 5-300 and low amine values are provided.

These novel polyamides can be advantageously used in accordance with the invention as curing agents for resins, in particular for epoxy resins. Epoxy resins are complex polymeric reaction products of polyfunctional phenols with polyfunctional halogenohydrins such as resorcinol and/or other bisphenols with epichlorohydrin and/or glycerol dichlorohydrin. Usually halogenohydrin is reacted in excess with respect to phenol and the reaction is carried out in an alkaline medium. Several of these epoxy resins which contain 2 or more epoxy groups in the molecule are commercially available, e.g. Epikotes ex Shell Oil Co.

The polyamides according to the present invention can be reacted with the epoxy resin by simple mixing, obviating the use of a solvent. Curing may take place with or without heating. The reactivity of the polyamide is expressed by its gel time, which was either determined at 20° C. by mixing 50 parts by weight of polyamide with 100 parts by weight of Epikote 828 or at 60° C. by mixing these ingredients in equivalent amounts.

The relative quantities of polyamide and epoxy resin combined depend, inter alia, on the reactivity of the two resins, i.e. on amine value and epoxide equivalent number and may differ widely. Equivalent amounts are often used, however 10-100 equivalent percent of reactive polyamide per epoxy equivalent can be used in general; in practice 10-50 percent by weight of polyamide per 90-50 percent by weight of epoxy resin is used. The polyamide/epoxy resin combinations are useful for many purposes, especially for coating casting resins, laminating and impregnating compositions. The epoxy resins thus cured showed an excellent colour stability and impact resistance. The invention also provides articles wholly and partially consisting of epoxy resins which have been cured employing a polyamide according to the invention.

The invention will now be illustrated by the following Examples:

In these Examples the ratio polymeric carboxylic acid/monocarboxylic acid expressed in equivalents was kept constant. The quantities indicated in the Tables below are weight quantities indicated in grams.

EXAMPLES 1-5

A series of polyamides was prepared from ingredients and at reaction conditions indicated in Table I, where the quantities indicated are weight quantities expressed in grams. The properties of the polyamides are also indicated and for comparison purposes polyamides known in the art are given.

TABLE I

| Example | 1 | Comp. 1 | 2 | Comp. 2 | 3 | Comp. 3 | 4 | Comp. 4 | 5 |
|---|---|---|---|---|---|---|---|---|---|
| Reaction temp. °C. (6 hrs) | 200 | 200 | 200 | 200 | 270 | 270 | 250 | 250 | 250 |
| Polymeric fatty acid D:T = 80:20 M<1) | 580 | 580 | 580 | 580 | 580 | 580 | 427 | 427 | 171 |
| Oleic acid | 191 | 191 | 141 | 139 | 191 | 191 | 282 | 282 | |
| 2 Ethylhexanoic acid | | | 73 | 72 | | | 47$^x$ | 47$^x$ | 94$^x$ 29$^{xx}$ |
| 3(2-amino ethyl) amino propylamine b.p. 80°/3 m bar | 183 | | 135 | | 183 | | 51.3 | | 212 |
| N,N' (bis-3-aminopropyl) ethylene diamine b.p. 170° C./3 m bar | 183 | | 135 | | 183 | | 457 | | 113 |
| TETA | | 338 | | 254 | | 349 | | 413 | |
| Visc. (Pa s) 75° C. | 0.25 | 0.78 | 0.94 | 2.15 | 0.13 | 0.30 | | | |
| (Pa s) 25° C. | 58 | 30.0 | | | 2.35 | 6.3 | 4.2 | 5.3 | 4.0 |
| Acid value | 1.3 | 0.7 | 0.4 | 0.9 | 0.8 | 0.5 | 0.1 | 0.1 | 0.1 |
| Amine value | 310 | 299 | 226 | 222 | 311 | 320 | 415 | 408 | 318 |
| Imidazoline %$^{xxx}$ | — | 10-20 | — | 10-20 | — | 60-80 | — | 60-80 | — |
| Gel time (min./temp. °C.) | 70/20 | 70/20 | 65/20 | 90/20 | 110/20 | 150/20 | 12/60 | 18/60 | 21/60 |

$^x$ = azelaic acid,
$^{xx}$ = adipic acid,
$^{xxx}$ = % imidazoline rings determined by infrared analysis at 6.20 mμ (% of theoretical conversion)

EXAMPLE 6

A polyamide was prepared by reacting the following ingredients at 250° C. for 6 hours:
Trimeric acid (T:D=80:20)—855 g,
3(2-amino ethyl)amino propylamine—351 g,
N,N'(bis-3-aminopropyl)ethylene diamine—190 g.

The resin showed an amine value of 418, an acid value of 0.2 and a viscosity at 75° C. of 1.3 Pa s.

For comparison purposes a similar polyamide was prepared using triethylene tetraamine (TETA) in an amount of 447 g and 855 g trimeric acid, which showed an amine value of 417, an acid value of 0.1 and a viscosity at 75° C. of 4.6 Pa s.

EXAMPLE 7

A polyamide was prepared by reacting the following ingredients at 250° C. for 6 hours:
Dimeric acid (M:D:T=0.1:95:5)—570 g
Oleic acid—282 g
3(2-amino ethyl)amino propylamine—51 g
N,N'(bis-3-aminopropyl)ethylene amine—439 g.

The pale resin showed an amine value of 350, an acid value of 0.1 and a viscosity at 25° C. of 5.5 Pa s.

EXAMPLES 8 AND 9

Polyamides were prepared by reacting the ingredients tabulated in Table II.

TABLE II

| Example | 8 | Comp. 8 | 9 | Comp. 9 |
|---|---|---|---|---|
| Reaction temp. °C. (6 hrs.) | 250 | 250 | 250 | 250 |
| Polymeric fatty acid | | | | |

TABLE II-continued

| Example | 8 | Comp. 8 | 9 | Comp. 9 |
|---|---|---|---|---|
| D:T = 80:20 (M < 1) | 570 | 570 | 570 | 570 |
| Oleic acid | 282 | 282 | 282 | 282 |
| 3(2-amino ethyl) amino propylamine | 93 | — | 97.5 | — |
| N,N'-(bis-aminopropyl) ethylene amine | 50 | — | 52.5 | — |
| TETA | — | 121 | — | 142 |
| Co-diamine | 93.4[x] | 92[x] | 180[xx] | 152[xx] |
| Viscosity (75°) Pa s | 0.86 | 1.03 | 1.00 | 3.1 |
| Amine value | 129 | 140 | 142 | 144 |
| Acid value | 0.2 | 0.1 | 0.1 | 0.1 |
| Imidazoline % | — | 50-60 | — | 50-60 |
| Gel time (min.) (equivalent amounts at 60° C.) | 60 | 80 | 35 | 48 |

[x] = piperazine
[xx] = trimethyl hexamethylene diamine

EXAMPLE 10

Polyamides were prepared by reacting the following ingredients at 230° C. for 8 hours:

Polymeric fatty acid (D:T=80:20)—467 g
Oleic acid—383 g
4,7,11-Triazatetradecane-1,14-diamine—468 g.

The resulting polyamide showed an amine value of 294, an acid value of 0.2 and a viscosity of 0.50 Pa s at 75° C. the gel time was 16 minutes (equivalent amounts mixed at 60° C.).

For comparison purposes a similar polyamide was prepared now using 363 g tetraethylene pentamine (TEPA) as the sole amine component. This polyamide showed an amine value of 306, an acid value of 0.1, an imidazoline content of about 60%, a viscosity of 0.75 Pa s at 75° C. and the gel time was 30 minutes (equivalent amounts mixed at 60° C.).

EXAMPLE 11

A polyamide was prepared by reacting the following ingredients at 250° C.:

Polymeric fatty acid (D:P=80:20/M<1)—379 g
Oleic acid—251 g
2-Ethylhexanoic acid—113 g
3(2-amino-ethyl)amino propylamine—55 g
N,N'(bis-3-aminopropyl)ethyleneamine—438 g.

The resulting polyamide showed an amine value of 385, an acid value <0.1, a viscosity of 3.0 Pa s at 25° C. and a gel time of 12 minutes (equivalent amounts admixed at 60° C.).

EXAMPLE 12

A polyamide was prepared by heating the following ingredients at 250° C. for 6 hours:

Polymeric fatty acid (D:T=80:20/M<1)—641 g
Oleic acid—211 g
3(2-aminoethyl)aminopropylamine—181.5 g.

The resulting polyamide showed an amine value of 89, an acid value of 1.4 and a viscosity at 75° C. of 14 Pa s.

What is claimed is:

1. A polyamide having an acid value less than 2, amine value from 5 to 600 and 75° C. viscosity from 0.05 to 25 Pa s and comprising the reaction product of (a) a polycarboxylic acid constituent consisting of a polymeric fatty acid and from 0 to 80 mol percent $C_{4-24}$ other dicarboxylic acid with (b) a polyamine constituent consisting of a polyalkylene polyamine of the general formula

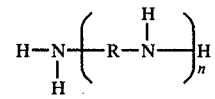

where n is an integer from 2 to 6 and R is a $C_{1-5}$ alkylene radical, with the proviso that at least two different $C_{1-5}$ alkylene groups are present, and from 0 to 50 mol percent other aliphatic, cycloaliphatic or aromatic polyamine.

2. The polyamide of claim 1 containing an amount up to 40 mol percent of a monoamine or monocarboxylic acid chain stopper.

3. The polyamide of claim 2 wherein the chain stopper is a $C_{8-18}$ straight or branched chain aliphatic monocarboxylic acid.

4. The polyamide of claim 1 or 2 wherein the polymeric fatty acid is obtained from the polymerization of a $C_{12-22}$ monocarboxylic acid and the polyalkylene polyamine is selected from the group consisting of 3-(2-aminoethyl)amino propylamine, N,N'-bis(3-aminopropyl)ethylenediamine, N,N'-bis(2-aminoethyl) 1,3-propylenediamine and 4,7,11-triaza-tetradecane-1,14-diamine.

5. The polyamide of claim 4 wherein the dicarboxylic acid is selected from the group consisting of adipic acid, azelaic acid, sebacic acid and terephthalic acid and the polyamine constituent contains less than 25 mol percent polyamine selected from the group consisting of trimethylhexamethylene diamine, isophorone diamine and piperazine.

6. The polyamide of claim 4 wherein the polymeric fatty acid is derived from a $C_{18}$ fatty acid.

7. The polyamide of claim 6 with 75° C. viscosity in the range 0.1 to 3.0 Pa s and acid value less than 1.

8. A process for curing epoxy resins comprising reacting a poly-epoxy comound with 10–100 equivalent percent of a polyamide as defined in claim 1.

9. Articles wholly or partially consisting of cured epoxy resin as obtained according to claim 8.

* * * * *